UNITED STATES PATENT OFFICE.

BERTRAND S. SUMMERS AND ROBERT JAMES BARR, OF CHICAGO, ILLINOIS, ASSIGNORS TO THE WESTERN ELECTRIC COMPANY, OF SAME PLACE.

SEMISTEEL.

SPECIFICATION forming part of Letters Patent No. 612,532, dated October 18, 1898.

Application filed March 13, 1897. Serial No. 627,412. (No specimens.)

*To all whom it may concern:*

Be it known that we, BERTRAND S. SUMMERS and ROBERT JAMES BARR, citizens of the United States, residing at Chicago, in the county of Cook and State of Illinois, have invented a certain new and useful Improvement in Semisteel, of which the following is a full, clear, concise, and exact description.

Our invention relates to an improved semisteel and process of making the same, our object being primarily to produce a metal or semisteel having magnetic properties and other characteristics which will peculiarly fit it for use in the manufacture of the field-magnets of dynamos, motors, and other electrical apparatus. While peculiarly adapted for this purpose, the metal will be found applicable to other uses.

For the manufacture of the field-magnets of dynamo-electric machines it is desirable that the metal possess high permeability—that is, offer small resistance to the passage of the magnetic flux or so-called "lines of magnetic force"—and also that it should produce small loss due to hysteresis; and it is the object of the present invention to produce a semisteel having this property of high permeability and low hysteretic loss to a marked degree, whereby a minimum amount of metal is necessitated in the construction of the field-magnet of a given capacity.

The semisteel of our invention does not possess as high permeability as steel; but it is cheaper and can be cast out of a cupola; hence can readily displace cast-iron, as it costs about the same or very little more, its properties being about midway between cast-steel and cast-iron.

The principal ingredients of commercial iron, besides the metal iron itself, are silicon, sulfur, phosphorus, manganese, and carbon. The carbon exists in two forms—the graphitic form, in which the carbon is in the form of graphite in a separated or free condition and distributed throughout the mass, and, second, in the combined form in which the carbon is chemically combined with other substances. In steel used in the manufacture of semisteel the carbon content is usually from 0.3 to 0.5 per cent., the carbon being practically all in the combined state. In the semisteel of the prior art the carbon content averages about three per cent. In cast-iron the carbon content ranges from three to 3.5 per cent., and the most of the carbon is in the graphitic state, in the proportion of, say, three per cent. graphitic carbon and 0.5 per cent. combined carbon.

The sulfur content is kept as low as possible in steel, cast-iron, and special metals, such as the semisteels. The presence of phosphorus tends to lower the breaking strain of the metal, and hence it is to be avoided where the metal is to be subjected to great strain; but the presence of the phosphorus does not affect the magnetic properties of the metal. We are therefore enabled to use metal having a high phosphorus content, which can be procured on the market at a much less cost than low phosphorus metal. When great strength is desired, it is desirable to diminish the phosphorus content. Manganese is kept as low as possible, as it tends to promote combined carbon, and thus lowers the magnetic permeability, which should be high in metal for magnetic purposes. The presence of the combined carbon in the metal tends to lower the permeability, while the presence of graphitic carbon raises the permeability.

In metal for magnetic purposes it is therefore desirable to have a minimum amount of combined carbon and to have the greatest portion of the carbon necessarily present in the metal in the form of graphitic carbon. Silicon in the metal lowers the loss by hysteresis, creates a fluidity which might be lacking in an iron of the same carbon content and less silicon, and, furthermore, prevents undue shrinkage. Silicon also has the peculiar property of throwing the carbon from the combined to the graphitic state.

Silicon lowers the saturation-point of iron for carbon, so that as the silicon content is increased the quantity of the carbon which the iron is capable of taking up is decreased.

The metal of the present invention is high in silicon content and low in carbon, and the great proportion of the carbon present is in the graphitic state, while a very small proportion of the carbon is in the combined state. A metal or semisteel is thus produced having peculiarly valuable magnetic properties for a cupola metal. It has a very high permeability and low loss by hysteresis and at the same time possesses a fluidity which enables its ready handling and molding, and the shrinkage of the metal in cooling is a minimum. Furthermore, the high silicon content renders possible a higher steel content in the metal, thus rendering it more dense and tougher, while permitting good tooling. Semisteels of the prior art usually charge less steel, thirty per cent. being considered a high amount. In accordance with the present invention forty to fifty per cent. is charged. The total carbon seldom exceeds 2.10 per cent. and is usually between 1.5 and two per cent., most of the carbon being in the graphitic state, the graphitic carbon averaging about 1.75 per cent., but varying from 1.50 to 1.90 per cent. It is the purpose to have as much of the carbon in the graphitic state as possible, and in the best specimens of the metal the combined carbon is less than 0.15 per cent., although it can run as high as 0.40 per cent. with slight detriment. The silicon is usually over four per cent., but may be as low as three per cent.; but the value of the metal suffers slightly with the latter proportion. The average is about 4.10 per cent.

The semisteel of the present invention is made in a practical way by mixing forty-five per cent. steel and fifty-five per cent. ferrosilicon iron of a low sulfur content and having about seven per cent. silicon. About twenty-five per cent. more coke is used in the cupola than with ordinary cast-iron and the metal is fluid and flows like cast-iron. The high silicon content protects the metal from great shrinkage.

The principle of the process is to displace carbon by silicon, so that the total amount of the carbon will be about 1.90 per cent. and as much of this as possible in the graphitic state. Heretofore in the production of semisteel it has been customary to add steel to soft foundry mixture—that is, ordinary cast-iron—the carbon content of which is three to four per cent. The alloy or metal thus produced is high in combined carbon, and the carbon content is considerably over two per cent., while in some semisteels, as the King and Andrews metal, it is about three per cent., and in these metals there is more combined carbon than graphitic carbon. The metal of the present invention is rich in silicon, usually over four per cent., while the semisteels heretofore produced seldom have over three per cent., the usual proportion being about 2.50 per cent.

While usually employing the proportions above enumerated—that is, forty-five per cent. of steel and fifty-five per cent. of ferrosilicon iron—we have employed other proportions, though the above proportions give the most satisfactory form of semisteel. With a ferrosilicon iron containing twelve per cent. silicon we have used seventy per cent. of steel, and with a ferrosilicon iron of seven per cent. silicon we have used about fifty per cent. of steel. This demonstrated that silicon may be made to displace carbon, making the metal flow like cast-iron. This displacement is limited, however, where it is necessary to tool the metal. When the carbon content is too low the metal becomes too hard.

As a ferrosilicon iron we have used among others the iron known to the trade as "Flaky Ashland" iron. We have also used Tropic Silvery iron No. 1. The compositions of these irons are as follows:

| | Flaky Ashland. Per cent. | Tropic Silvery. Per cent. |
|---|---|---|
| Silicon | 7.10 | 7.06 |
| Sulfur | .016 | .096 |
| Phosphorus | 1.13 | 1.485 |
| Manganese | .585 | .75 |
| Graphitic carbon | 2.17 | 1.96 |
| Combined carbon | .15 | .34 |

The carbon of the steel with which the ferrosilicon iron is mixed is wholly combined carbon.

The composition of several specimens of the semisteel of our invention are as follows:

| | First specimen. | Second specimen. | Third specimen. | Fourth specimen. |
|---|---|---|---|---|
| Silicon | 4.07 | 4.04 | 4.11 | 3.79 |
| Sulfur | .091 | .107 | .078 | .117 |
| Phosphorus | .95 | .783 | .925 | .861 |
| Manganese | .58 | .36 | .39 | .35 |
| Graphitic carbon | 1.83 | 1.75 | 1.72 | 1.73 |
| Combined carbon | .11 | .13 | .03 | .08 |

It will be noted that the semisteel is rich in silicon and contains a small amount of carbon, the larger proportion of which is in the graphitic state, while a very small proportion is in the combined state. As all of the carbon in the steel employed is combined, it will be noted that the process results in throwing the carbon from the combined to the graphitic state. This is greatly due to the high silicon content. The silicon content of our semisteel is larger than the silicon content of cast-iron, which usually ranges from 2.8 to 3.2 per cent., and this larger silicon content is one of the distinguishing features of our semisteel. In semisteels of the prior art the silicon content has been much below the silicon content of cast-iron, usually from 1.7 to 2.5 per cent.

Another distinguishing feature of this semisteel is the low carbon content, ranging from 1.75 to two per cent., and, furthermore, the large proportion of the carbon in the graphitic state and the low percentage in the combined state, the graphitic carbon ranging in the specimens above considered from 1.72 to 1.83 per cent., while the combined carbon is as low as 0.03 to 0.15 per cent. In semisteels of the prior art the carbon content is quite high and a considerable quantity of carbon is in the combined state. Thus in the Ramsey semisteel the carbon content is as high as three per cent., the graphitic carbon averaging, say, 2.5 per cent., while the combined carbon runs from 0.55 to 0.78 per cent. In some forms of semisteel of the prior art—as, for instance, in the King and Andrews semisteel—the carbon content is as high as three per cent., with the combined carbon and the graphitic carbon about equal in proportion, while in some semisteels the combined carbon is even in excess of the graphitic carbon.

The following is an analysis of the composition of a specimen of the King and Andrews semisteel and of several other semisteels and of cast-iron:

|  | King and Andrews. | Other semisteels. | | |
| --- | --- | --- | --- | --- |
| Silicon | 1.74 | 2.491 | 2.373 | 2.243 |
| Sulfur | .099 | .088 | .095 | .1 |
| Phosphorus | .434 | .839 | .771 | .706 |
| Manganese | .684 | .717 | .499 | .79 |
| Graphitic carbon | 1.42 | 2.62 | 2.53 | 2.383 |
| Combined carbon | 1.56 | .556 | .666 | .785 |

*Analysis of Cast-Iron.*

| | | | |
| --- | --- | --- | --- |
| Silicon | 3.11 | 2.81 | 2.91 |
| Sulfur | .057 | .07 | .063 |
| Phosphorus | .723 | .607 | .407 |
| Manganese | .586 | .582 | .303 |
| Graphitic carbon | 3.08 | 3.15 | 2.84 |
| Combined carbon | .039 | .25 | .29 |

As before pointed out, to secure a semisteel well adapted for magnetic purposes the metal must have a high silicon content and a low carbon content and very little of the carbon must be in the combined state. In the semisteel of our invention the silicon content compared with other semisteels is very high and the metal is very low in carbon for a cupola metal, while possessing a minimum amount of combined carbon, most of the carbon present being in the graphitic state.

While we have described our invention more particularly with reference to its electrical and magnetic properties, the metal is applicable to any of the arts where it is desirable to produce a cast or cupola metal of superior strength and capable of being readily tooled. The transverse breaking stress of this metal greatly exceeds that of cast-iron and also that of semisteels of the prior art. Two bars of the metal of the present invention when tested for transverse breaking stress ran three thousand nine hundred and ten pounds and three thousand nine hundred pounds. Two bars of the standard make of semisteel of the prior art broke at three thousand two hundred and sixty-two and three thousand one hundred and sixty pounds. A good cast-iron will seldom reach two thousand four hundred pounds under the same conditions. These specimens were broken on twelve-inch centers.

In casting the metal it is desirable to utilize each day the sprues from the previous day's casting. In passing through the cupola and the casting the carbon and the silicon in the metal comprising the sprues are oxidized to some extent, and in consequence in utilizing these sprues they must be enriched to such an extent that when mixed in the cupola the alloy will have about the composition of the mixture of forty-five per cent. steel and fifty-five per cent. ferrosilicon iron. This is accomplished by mixing with the quantity of steel a little larger quantity of ferrosilicon iron and a very small amount of soft iron to raise the carbon content and thus compensate for the loss due to oxidation.

In practice we have used, say, eighteen pounds of soft foundry-iron, such as sterling Scotch, six hundred and fifty-five pounds of the ferrosilicon iron, such as flaky Ashland, two hundred and ninety-eight pounds of steel, and five hundred and twenty-nine pounds of sprues. The analysis of several specimens of sterling Scotch iron give the following proportions:

| | | |
| --- | --- | --- |
| Silicon | 2.07 | 3.13 |
| Sulfur | .028 | .019 |
| Phosphorus | .256 | .242 |
| Manganese | .780 | .34 |
| Graphitic carbon | 3.50 | 3.63 |
| Combined carbon | .12 | .22 |

It is a matter of simple calculation to vary the weights in order to utilize the amounts of sprues to be charged. The utilization of the sprues is based on the principle that two irons of identical or very nearly identical composition will have practically the same qualities when worked under like conditions. It is therefore the object to provide the same proportion of constituents in the mixture of steel, ferrosilicon iron, and sprues as would be present in the mixture of steel and ferrosilicon iron in the absence of the sprues, and the deficiency of carbon in the sprues is supplied by the addition of a small quantity of soft foundry-iron, while the deficiency of silicon is supplied by increasing the amount of the ferrosilicon charge.

By the term "cupola metal" as employed herein is meant such metal as is mixed and melted in a furnace known in the art as a "cupola" or in one having the same effect upon the metal as the cupola as now constructed. Steel is not a cupola metal, since it cannot be melted in a cupola and cast with success.

In practicing our invention we have used a mild steel of from .3 to .5 per cent. carbon, such as rail-steel. However, other low carbon metals may be utilized, whether they may be made by the open-hearth or Bessemer or other types of furnace. We have used metal of considerably lower carbon content with success, but prefer to use rail-steel on account of its cheapness and convenient bulk. The word "steel" as used herein is to be interpreted as referring to any low carbon metal of analogous composition to the metal known as "Bessemer steel."

We have made specific claims to proportions of the several ingredients of our semisteel, which we find peculiarly valuable; but where such specific proportions are not enumerated in the claims the proportions are understood to be such as are pointed out in the specification as permissible.

Having described our invention, what we claim as new, and desire to secure by Letters Patent, is—

1. The herein-described process of producing a cupola semisteel which consists in introducing into a cupola, a low carbon metal such as Bessemer rail-steel and ferrosilicon iron, and subjecting the same to heat to cause the constituent elements to unite to form a metal having the casting properties of cast-iron and having a high silicon content as compared with other cupola metals and having a low carbon content the greater proportion of which carbon is in the graphitic state while a minimum amount of the carbon is in the combined state, substantially as described.

2. The herein-described process of producing a cupola metal which consists in introducing into a cupola, a low carbon metal, such as Bessemer rail-steel, ferrosilicon iron, sprues having approximately the composition of the metal desired but lower in carbon and silicon and soft foundry-iron and subjecting the same to heat to cause the constituent elements to unite to form a metal having a high silicon content as compared with other cupola metals and having a low carbon content the greater proportion of which carbon is in the graphitic state while a minimum amount of carbon is in the combined state, substantially as described.

3. The herein-described process of producing a cupola semisteel which consists in introducing into a cupola low carbon metal, such as Bessemer rail-steel, and ferrosilicon iron, and subjecting the same to heat to cause the constituent elements to unite to form a cupola metal having the casting properties of cast-iron and having the silicon content between three and five per cent., the total carbon content between 1.5 and 2.5 per cent., the combined carbon of which does not exceed 0.5 per cent., the remainder being in the graphite state, substantially as described.

4. The herein-described process of producing a cupola metal which consists in introducing into a cupola low carbon metal, such as Bessemer rail-steel, ferrosilicon iron, soft foundry mixture and sprues having approximately the composition of the metal desired but lower in carbon and silicon, and subjecting the same to heat to cause the constituent elements to unite to form a metal having the casting properties of cast-iron and having the silicon content between three and five per cent., the total carbon content between 1.5 and 2.5 per cent., the combined carbon of which does not exceed 0.5 per cent., the remainder being in the graphite state, substantially as described.

5. The herein-described process of producing a cupola metal which consists in introducing into a cupola forty-five per cent. of low carbon metal, such as Bessemer rail-steel, and fifty-five per cent. of the ferrosilicon iron, and subjecting the same to heat to cause the constituent elements to unite to form a metal having the casting properties of cast-iron, having a high silicon content as compared with other cupola metals and having a low carbon content, the greater portion of which carbon is in the graphite state, while a minimum amount of the carbon is in the combined state, substantially as described.

6. The herein-described process of producing a cupola metal which consists in introducing into a cupola low carbon metal, such as Bessemer rail-steel, ferrosilicon iron, soft foundry mixture, and sprues having approximately the composition of the metal desired but lower in carbon and silicon, the silicon and carbon content of said combined ingredients being substantially the same as the silicon and carbon content of a mixture of forty-five per cent. of said low carbon metal and fifty-five per cent. ferrosilicon iron, and subjecting said ingredients to heat to cause the constituent elements to unite to form a metal having the casting properties of cast-iron, having a high silicon content as compared with other cupola metals, and having a low carbon content, the greater proportion of which carbon is in the graphitic state while a minimum amount of the carbon is in the combined state, substantially as described.

In witness whereof we have hereunto subscribed our names in the presence of two witnesses.

BERTRAND S. SUMMERS.
ROBERT JAMES BARR.

Witnesses:
W. CLYDE JONES,
M. R. ROCHFORD.